(12) United States Patent
Tamao et al.

(10) Patent No.: US 12,418,193 B2
(45) Date of Patent: Sep. 16, 2025

(54) SOLAR CONTROL SYSTEM, METHOD, MEDIUM, AND VEHICLE

(71) Applicant: TOYOTA JIDOSHA KABUSHIKI KAISHA, Toyota (JP)

(72) Inventors: Junichiro Tamao, Nagoya (JP); Tetsuro Nakamura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 725 days.

(21) Appl. No.: 17/805,731

(22) Filed: Jun. 7, 2022

(65) Prior Publication Data
US 2023/0067065 A1    Mar. 2, 2023

(30) Foreign Application Priority Data
Aug. 30, 2021 (JP) ................. 2021-139803

(51) Int. Cl.
| | |
|---|---|
| H02J 7/35 | (2006.01) |
| B60L 8/00 | (2006.01) |
| H02J 7/00 | (2006.01) |
| H02M 1/00 | (2007.01) |
| H02M 1/32 | (2007.01) |
| H02M 3/158 | (2006.01) |

(52) U.S. Cl.
CPC ............ *H02J 7/35* (2013.01); *B60L 8/003* (2013.01); *H02J 7/0047* (2013.01); *H02M 1/0009* (2021.05); *H02M 1/32* (2013.01); *H02M 3/158* (2013.01); *B60L 2210/10* (2013.01); *H02J 2207/20* (2020.01); *H02J 2300/24* (2020.01)

(58) Field of Classification Search
CPC ..... H02J 7/0047; H02M 3/158; H02M 1/0009
See application file for complete search history.

(56) References Cited

U.S. PATENT DOCUMENTS

2016/0250928 A1\*   9/2016   Matsuda ................. B60L 53/53
                                                                      701/22

FOREIGN PATENT DOCUMENTS

| JP | 2008055948 A | \* | 3/2008 |
|---|---|---|---|
| JP | 2013038917 A | \* | 2/2013 |
| JP | 2013187108 A | \* | 9/2013 |
| JP | 2018019526 A | | 2/2018 |
| JP | 2018133905 A | \* | 8/2018 |
| JP | 2019170130 A | | 10/2019 |
| JP | 2021087291 A | \* | 6/2021 |

OTHER PUBLICATIONS

Junichiro Tamao et al., U.S. Appl. No. 17/808,689, filed Jun. 24, 2022.
Yukinori Murakami, U.S. Appl. No. 17/815,986, filed Jul. 29, 2022.

\* cited by examiner

*Primary Examiner* — Julian D Huffman
*Assistant Examiner* — John Ondrasik
(74) *Attorney, Agent, or Firm* — Dickinson Wright, PLLC

(57) ABSTRACT

A solar control system includes a solar unit configured to output electric power generated by a solar panel, a battery configured to be supplied with electric power from the solar unit, a first DDC and a second DDC inserted in parallel between the solar unit and the battery and each configured to control electric power, supplied from the solar unit to the battery, based on a command value, a first sensor configured to detect an output current from the first DDC, and a second sensor configured to detect an output current from the second DDC.

7 Claims, 5 Drawing Sheets

SOLAR CONTROL SYSTEM, METHOD, MEDIUM, AND VEHICLE

CROSS-REFERENCE TO RELATED APPLICATION

This application claims priority to Japanese Patent Application No. 2021-139803 filed on Aug. 30, 2021, incorporated herein by reference in its entirety.

BACKGROUND

1. Technical Field

The disclosure relates to a solar control system, method, medium, and vehicle that control the charging of a battery with electric power generated by a solar panel.

2. Description of Related Art

Japanese Unexamined Patent Application Publication No. 2021-087291 (JP 2021-087291 A) describes a solar control system that includes two solar panels, two solar DC-DC converters respectively provided in correspondence with the solar panels, a high-voltage DC-DC converter that supplies a high-voltage battery with electric power output from the solar DC-DC converters, and an auxiliary DC-DC converter that supplies an auxiliary battery with electric power output from the solar DC-DC converters.

SUMMARY

In the system that includes the plurality of DC-DC converters, described in JP 2021-087291 A, when there is an abnormality in the system, it is possible to identify an abnormal DC-DC converter. However, it is not possible to determine whether the abnormality is due to the DC-DC converter itself or due to a sensor that monitors the input and output power of the DC-DC converter.

The disclosure provides a solar control system, method, medium, and vehicle that are capable of, when there is an abnormality in a DC-DC converter, determining whether the abnormality is due to the DC-DC converter itself or due to a sensor that monitors the output power of the DC-DC converter.

A first aspect of the technology of the disclosure provides a solar control system. The solar control system includes a solar unit configured to output electric power generated by a solar panel, a battery configured to be supplied with electric power from the solar unit, a first DC-DC converter and a second DC-DC converter inserted in parallel between the solar unit and the battery and each configured to control electric power, supplied from the solar unit to the battery, based on a command value, a first sensor configured to detect a first output current output from the first DC-DC converter, and a second sensor configured to detect a second output current output from the second DC-DC converter.

The solar control system according to the first aspect may further include a processing unit configured to, when there is an abnormality in the system, determine whether there is an abnormality in at least one of the first sensor and the second sensor based on a differential value between the first output current and the second output current.

In the solar control system according to the first aspect, the processing unit may be configured to, when an abnormality other than an abnormality of the first sensor or an abnormality of the second sensor has been already determined, end the determination based on the differential value between the first output current and the second output current.

In the solar control system according to the first aspect, the processing unit may be configured to, when there is an abnormality in the system, determine whether there is an abnormality in at least one of the first DC-DC converter and the second DC-DC converter based on a total value of the first output current and the second output current in a state where the command value for setting an output current to zero is issued.

In the solar control system according to first aspect, the processing unit may be configured to perform the determination based on the total value of the first output current and the second output current after the determination based on the differential value between the first output current and the second output current.

In the solar control system according to first aspect, the processing unit may be configured to, when an abnormality other than an abnormality of the first DC-DC converter or an abnormality of the second DC-DC converter has been already determined, end the determination based on the total value of the first output current and the second output current.

In the solar control system according to first aspect, the processing unit may be configured to, when the differential value between the first output current and the second output current exceeds a first threshold, determine that at least one of the first sensor and the second sensor is in an abnormal state in which the at least one of the first sensor and the second sensor always detects a maximum value.

In the solar control system according to first aspect, the processing unit may be configured to, when the total value of the first output current and the second output current exceeds a second threshold, determine that at least one of the first DC-DC converter and the second DC-DC converter is in an abnormal state in which the at least one of the first DC-DC converter and the second DC-DC converter outputs an excessive current not in accordance with the command value.

The solar control system according to the first aspect may further include a third DC-DC converter inserted between the solar unit and the battery in parallel with the first DC-DC converter and the second DC-DC converter and configured to control electric power, supplied from the solar unit to the battery, based on the command value, and a third sensor configured to detect a third output current output from the third DC-DC converter. The processing unit may be configured to, when there is an abnormality in the system, determine whether there is an abnormality in at least one of the first sensor, the second sensor, and the third sensor and identify the sensor in which there is an abnormality based on the differential value between the first output current and the second output current, a differential value between the second output current and the third output current, and a differential value between the first output current and the third output current.

A second aspect of the technology of the disclosure provides a vehicle that includes the solar control system according to the first aspect.

A third aspect of the technology of the disclosure provides a method that is executed by a solar control system. The solar control system includes a solar unit configured to output electric power generated by a solar panel, a battery configured to be supplied with electric power from the solar unit, a first DC-DC converter and a second DC-DC converter inserted in parallel between the solar unit and the battery and each configured to control electric power, supplied from the solar unit to the battery, based on a command value, a first sensor configured to detect a first output current output from the first DC-DC converter, and a second sensor configured to detect a second output current output from the second DC-DC converter. The method includes determining whether there is an abnormality in at least one of the first sensor and the second sensor based on a differential value between the first output current and the second output current, when there is an abnormality in the system, and determining whether there is an abnormality in at least one of the first DC-DC converter and the second DC-DC converter based on a total value of the first output current and the second output current in a state where the command value for setting an output current to zero is issued, when there is an abnormality in the system.

A fourth aspect of the technology of the disclosure provides a non-transitory storage medium. The non-transitory storage medium stores functions that are executed by a computer of a solar control system. The solar control system includes a solar unit configured to output electric power generated by a solar panel, a battery configured to be supplied with electric power from the solar unit, a first DC-DC converter and a second DC-DC converter inserted in parallel between the solar unit and the battery and each configured to control electric power, supplied from the solar unit to the battery, based on a command value, a first sensor configured to detect a first output current output from the first DC-DC converter, and a second sensor configured to detect a second output current output from the second DC-DC converter. The functions include determining whether there is an abnormality in at least one of the first sensor and the second sensor based on a differential value between the first output current and the second output current, when there is an abnormality in the system, and determining whether there is an abnormality in at least one of the first DC-DC converter and the second DC-DC converter based on a total value of the first output current and the second output current in a state where the command value for setting an output current to zero is issued, when there is an abnormality in the system.

With the solar control system, method, medium, and vehicle according to the aspects of the technology of the disclosure, it is possible to, when there is an abnormality in a DC-DC converter, determine whether the abnormality is due to the DC-DC converter itself or due to a sensor that monitors the output power of the DC-DC converter.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A solar control system according to the disclosure includes an auxiliary DC-DC converter made up of two converter circuits connected in parallel with each other and determines whether there is an abnormality in the auxiliary DC-DC converter itself or there is an abnormality in an output sensor of the auxiliary DC-DC converter based on a differential value between currents respectively flowing through the two converter circuits and a total value of the currents respectively flowing through the two converter circuits. Hereinafter, embodiments of the disclosure will be described in detail with reference to the accompanying drawings.

EMBODIMENT

Configuration

Figure 1:
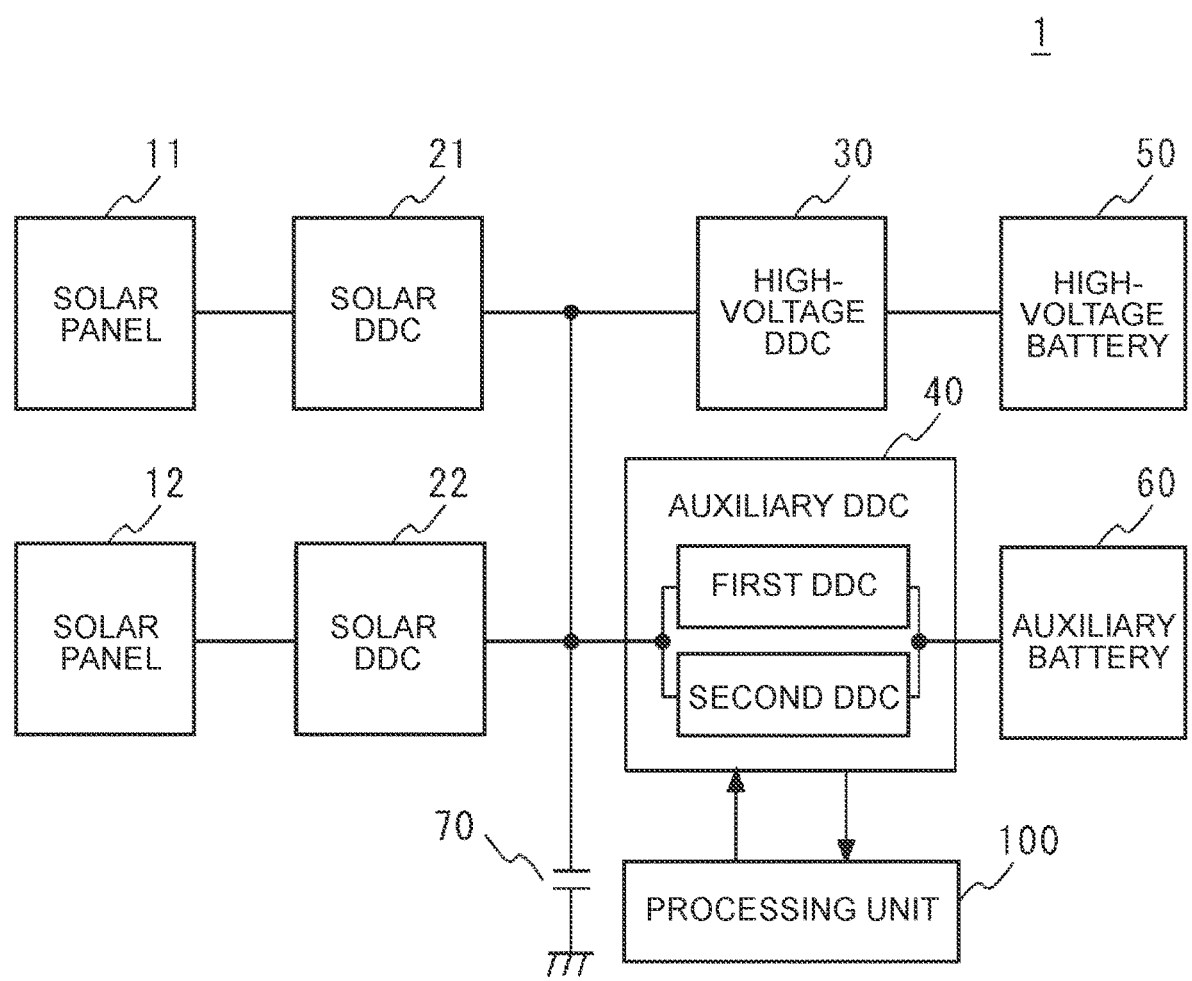
FIG. 1 is a schematic configuration diagram of a solar control system according to an embodiment.

FIG. 1 is a block diagram showing the schematic configuration of a solar control system according to an embodiment of the disclosure. The solar control system 1 illustrated in FIG. 1 includes two solar panels 11, 12, two solar DDCs 21, 22, a high-voltage DDC 30, an auxiliary DDC 40, a high-voltage battery 50, an auxiliary battery 60, a capacitor 70, and a processing unit 100. The solar control system 1 may be mounted on a vehicle or the like.

Each of the solar panels 11, 12 is a power generation apparatus that generates electric power by irradiation with sunlight and is typically a solar cell module that is a collection of solar cells. The solar panels 11, 12 may be installed on, for example, a roof, or the like, of a vehicle. The solar panel 11 is connected to the solar DDC 21 (described later), and electric power generated by the solar panel 11 is output to the solar DDC 21. The solar panel 12 is connected to the solar DDC 22 (described later), and electric power generated by the solar panel 12 is output to the solar DDC 22. The solar panel 11 and the solar panel 12 may have the same performance, capacity, size, shape, and the like or may be partially or totally different.

The solar DDCs 21, 22 are respectively provided in correspondence with the solar panels 11, 12. Each of the solar DDCs 21, 22 is a DC-DC converter that supplies the high-voltage DDC 30 and the auxiliary DDC 40 with electric power generated by a corresponding one of the solar panels 11, 12. When the solar DDC 21 supplies electric power, the solar DDC 21 is capable of converting (stepping up or stepping down) a power generation voltage of the solar panel 11, which is an input voltage, to a predetermined voltage and outputting the voltage to the high-voltage DDC 30 and the auxiliary DDC 40. When the solar DDC 22 supplies electric power, the solar DDC 22 is capable of converting (stepping up or stepping down) a power generation voltage of the solar panel 12, which is an input voltage, to a predetermined voltage and outputting the voltage to the high-voltage DDC 30 and the auxiliary DDC 40. The configurations and performances of the solar DDCs 21, 22 may be the same or may be varied in accordance with the solar panels 11, 12.

Among the solar panels 11, 12 and the solar DDCs 21, 22, the solar panel 11 and the solar DDC 21 make up one solar unit, and the solar panel 12 and the solar DDC 22 make up one solar unit. In the solar control system 1 according to the present embodiment, the configuration in which the two solar units are provided in parallel will be described as an example. A solar control system may be configured such that only one solar unit is provided or three or more solar units are provided.

The high-voltage DDC 30 is a DC-DC converter that supplies the high-voltage battery 50 with electric power output from the solar DDCs 21, 22. When the high-voltage DDC 30 supplies electric power, the high-voltage DDC 30 is capable of converting (stepping up) an output voltage of the solar DDCs 21, 22, which is an input voltage, to a predetermined voltage and outputting the voltage to the high-voltage battery 50.

The auxiliary DDC 40 is a DC-DC converter that supplies the auxiliary battery 60 with electric power output from the solar DDCs 21, 22. When the auxiliary DDC 40 supplies electric power, the auxiliary DDC 40 is capable of converting (stepping down) an output voltage of the solar DDCs 21, 22, which is an input voltage, to a predetermined voltage and outputting the voltage to the auxiliary battery 60. The auxiliary DDC 40 according to the present embodiment is made up of the same two converter circuits (a first DDC and a second DDC) connected in parallel in order to increase outputtable power capacity (two-phase configuration).

Figure 2:
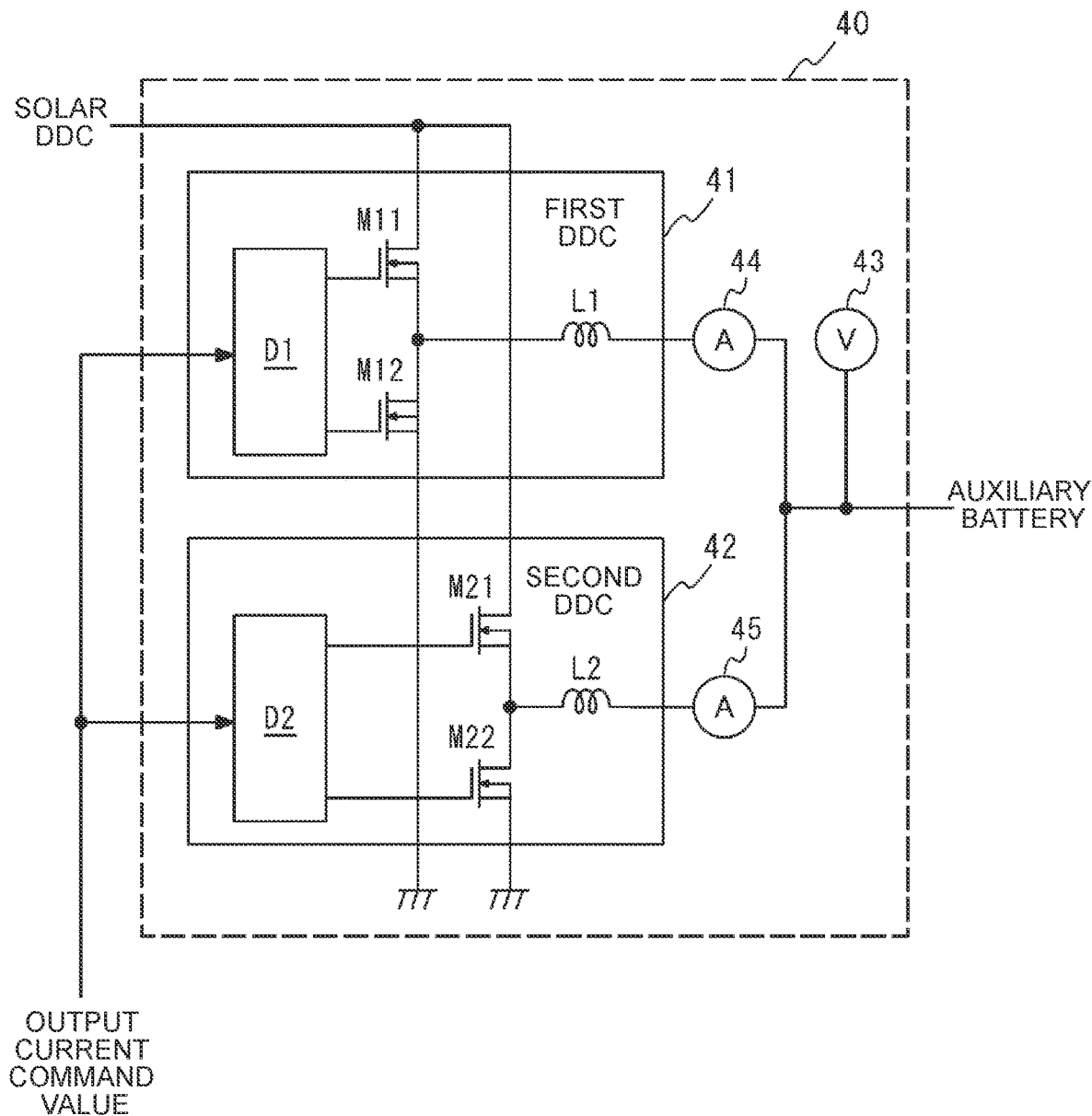
FIG. 2 is an example of a detailed circuit of an auxiliary DDC.

FIG. 2 shows an example of the detailed circuit of the auxiliary DDC 40 made up of the same two DC-DC converters connected in parallel. The auxiliary DDC 40 illustrated in FIG. 2 includes the first DDC 41, the second DDC 42, an output voltage sensor 43, a first output current sensor 44, and a second output current sensor 45.

The first DDC 41 is a DC-DC converter that includes a switching element M11, a switching element M12, an inductor L1, and a drive circuit D1. The first DDC 41 controls the on-off operation of each of the switching elements M11, M12 by the drive circuit D1 based on an output current command value received from a DDC control unit (not shown). The second DDC 42 is a DC-DC converter that includes a switching element M21, a switching element M22, an inductor L2, and a drive circuit D2. The second DDC 42 controls the on-off operation of each of the switching elements M21, M22 by the drive circuit D2 based on an output current command value received from the DDC control unit (not shown). The first DDC 41 and the second DDC 42 are connected in parallel. The output voltage sensor 43 is a sensor that monitors and detects the output-side (auxiliary battery 60-side) voltage of the auxiliary DDC 40. The first output current sensor 44 is a sensor that monitors and detects a current output from the first DDC 41 to the output side (auxiliary battery 60 side). The second output current sensor 45 is a sensor that monitors and detects a current output from the second DDC 42 to the output side (auxiliary battery 60 side). The values of output voltage and output currents respectively detected by the sensors are output to the processing unit 100.

The auxiliary DDC 40 may include a sensor that detects a current input from the solar DDCs 21, 22 to the auxiliary DDC 40 or a sensor that detects the input-side voltage of the auxiliary DDC 40. One or some or all of the output voltage sensor 43, the first output current sensor 44, and the second output current sensor 45 may be provided as components of the solar control system 1, other than the auxiliary DDC 40.

The high-voltage battery 50 is, for example, a rechargeable secondary battery, such as a lithium ion battery and a nickel-metal hydride battery. The high-voltage battery 50 is connected to the high-voltage DDC 30 so as to be chargeable with electric power output from the high-voltage DDC 30. The high-voltage battery 50 mounted on a vehicle may be, for example, a so-called drive battery capable of supplying electric power required for the operation of a main device (not shown) for driving the vehicle, such as a starter motor and an electric motor.

The auxiliary battery 60 is, for example, a rechargeable secondary battery, such as a lithium ion battery and a lead acid battery. The auxiliary battery 60 is connected to the auxiliary DDC 40 so as to be chargeable with electric power output from the auxiliary DDC 40. The auxiliary battery 60 mounted on a vehicle is a battery capable of supplying electric power required for the operations of auxiliary devices (not shown) other than for driving the vehicle, including lamps, such as a head lamp and an interior lamp, air conditioners, such as a heater and a cooler, and devices for autonomous driving and advanced driving assistance.

The capacitor 70 is connected between the solar DDCs 21, 22 and both the high-voltage DDC 30 and the auxiliary DDC 40. The capacitor 70 is a large-capacity capacitive element used to, for example, charge and discharge electric power generated at the solar panels 11, 12 as needed or stabilize the voltage generated between the output of the solar DDCs 21, 22 and the input of both the high-voltage DDC 30 and the auxiliary DDC 40. The capacitor 70 may be omitted from the components of the solar control system 1.

The processing unit 100 acquires at least the output current of the first DDC 41 and the output current of the second DDC 42, of the output voltage and output currents detected in the auxiliary DDC 40. The processing unit 100 is capable of monitoring an output current command value provided to the auxiliary DDC 40. When there is an abnormality in the auxiliary DDC 40, the processing unit 100 determines whether the abnormality is due to the auxiliary DDC 40 itself or due to the sensor (the first output current sensor 44 or the second output current sensor 45) of the auxiliary DDC 40, based on the two output current values acquired from the auxiliary DDC 40, and the output current command value.

One or some or all of the solar DDCs 21, 22, the high-voltage DDC 30, the auxiliary DDC 40, and the processing unit 100 can be configured as an electronic control unit (ECU) that typically includes a processor, a memory, an input/output interface, and the like. The electronic control unit is capable of executing the above-described various controls by the processor reading programs stored in the memory and running the programs.

Control

Next, an abnormality detection process that is executed by the solar control system 1 when there is an abnormality in the auxiliary DDC 40 will be described further with reference to FIG. 3 to FIG. 5. The abnormality detection process includes a first abnormality detection process intended to detect high sticking of the sensor (the first output current sensor 44 or the second output current sensor 45), and a second abnormality detection process intended to detect an excessive output from the first DDC 41 or the second DDC 42. The first abnormality detection process and the second abnormality detection process are executed in parallel.

(1) First Abnormality Detection Process

Figure 3:
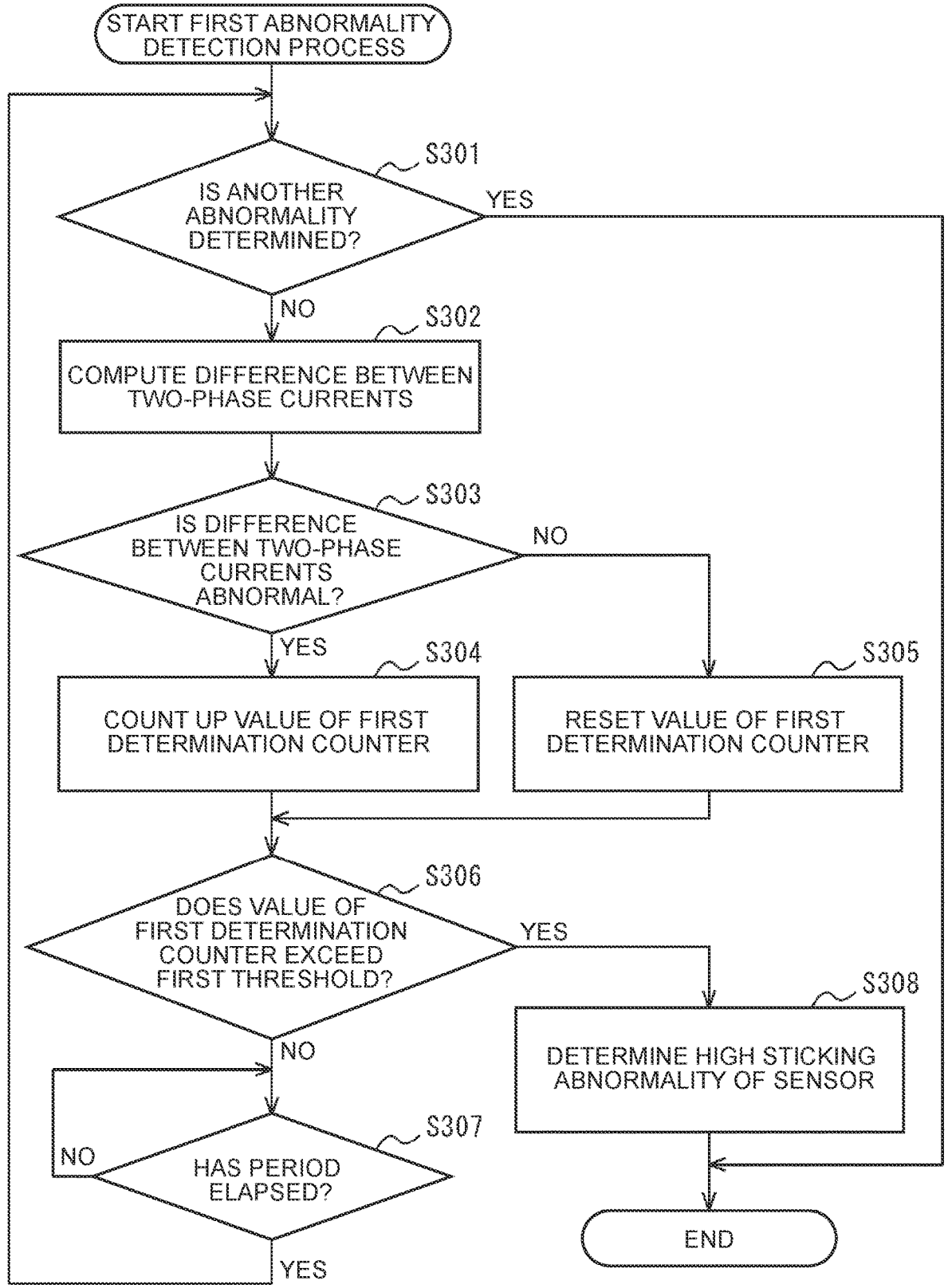
FIG. 3 is a flowchart of a first abnormality detection process that is executed by the solar control system.

FIG. 3 is a flowchart that illustrates the procedure of the first abnormality detection process that is executed by the processing unit 100 of the solar control system 1. The first abnormality detection process illustrated in FIG. 3 is started when, for example, an ignition of the vehicle is turned on and is repeatedly executed at intervals of a predetermined period (for example, 8 ms) until the source of the abnormality is determined and the process ends. At the start of the process, the count value of a first determination counter (described later) is reset.

Step S301

The processing unit 100 determines whether another abnormality is determined in the solar control system 1. Another abnormality is an abnormality other than high sticking of a sensor subjected to detection in the first abnormality detection process and may include, for example, an abnormality of the solar DDC 21, an abnormality of the high-voltage DDC 30, and the like. If the first abnormality detection process is executed when another abnormality has been already determined, it is presumable that an accurate result or a high-reliability result is not obtained. Thus, when another abnormality is determined (YES in step S301), the first abnormality detection process ends. On the other hand, when another abnormality is not determined (NO in step S301), the process proceeds to step S302.

Step S302

The processing unit 100 computes a difference between two-phase currents. A difference between two-phase currents is a differential value between a current output from the first DDC 41 of the auxiliary DDC 40 and a current output from the second DDC 42 of the auxiliary DDC 40. The processing unit 100 acquires the value of current detected by the first output current sensor 44 and the value of current detected by the second output current sensor 45 from the auxiliary DDC 40 and computes a current differential value (current deviation) by taking a difference between those values. When the difference between two-phase currents is computed, the process proceeds to step S303.

Step S303

The processing unit 100 determines whether the difference between two-phase currents is abnormal. The determination is performed based on whether the absolute value of the current differential value between the first DDC 41 and second DDC 42 of the auxiliary DDC 40 exceeds a predetermined first reference value. An abnormality detection condition is expressed by the expression [|(Output current value of the first DDC 41)—(Output current value of the second DDC 42)|>(First reference value)]. The first reference value may be set to a predetermined value based on a current differential value allowed in a state where the first DDC 41 and the second DDC 42 both are operating normally in consideration of variations, performance, and the like of the switching elements, inductors, and output current sensors. When the difference between two-phase currents is abnormal (YES in step S303), the process proceeds to step S304. On the other hand, when the difference between two-phase currents is normal (NO in step S303), the process proceeds to step S305.

Step S304

The processing unit 100 counts up by incrementing the value of the first determination counter by one. The first determination counter is a counter for achieving abnormality determination on the difference between two-phase currents with high reliability and is used to count a time during which the abnormal state of the difference between two-phase currents is continuing. The first determination counter is typically provided in the processing unit 100. When the value of the first determination counter is counted up, the process proceeds to step S306.

Step S305

The processing unit 100 resets the value of the first determination counter to zero. This reset means that the abnormal state of the difference between two-phase currents, which has been continued from its occurrence, is interrupted. When the value of the first determination counter is reset, the process proceeds to step S306.

Step S306

The processing unit 100 determines whether the value of the first determination counter exceeds a first threshold. The determination is performed in order to determine an abnormality in the difference between two-phase currents with high reliability. Thus, the first threshold that corresponds to a time taken from occurrence of an abnormality to determination of the abnormality is set to a selected value (count value or time), with which high reliability is ensured, based on the specifications, performance, and the like of the first DDC 41 and the second DDC 42. When the value of the first determination counter exceeds the first threshold (YES in step S306), the process proceeds to step S308. On the other hand, when the value of the first determination counter does not exceed the first threshold (NO in step S306), the process proceeds to step S307.

Step S307

In order to repeatedly execute the process from step S301, step S302, step S303, step S304, step S305, and step S306 at regular intervals of a predetermined period, the processing unit 100 determines whether the predetermined period has elapsed to execute the process. The predetermined period may be set to a selected value based on the performance desired for the vehicle, the durability of parts or elements used in the solar control system 1, and the like. When the period has elapsed (YES in step S307), the process proceeds to step S301.

Step S308

The processing unit 100 determines a so-called high sticking abnormality, which is an abnormality that is occurring in a sensor and in which the sensor always outputs a maximum value as a detected value, based on an abnormality in the difference between two-phase currents. When the high sticking abnormality of the sensor is determined, the first abnormality detection process ends.

(2) Second Abnormality Detection Process

Figure 4:
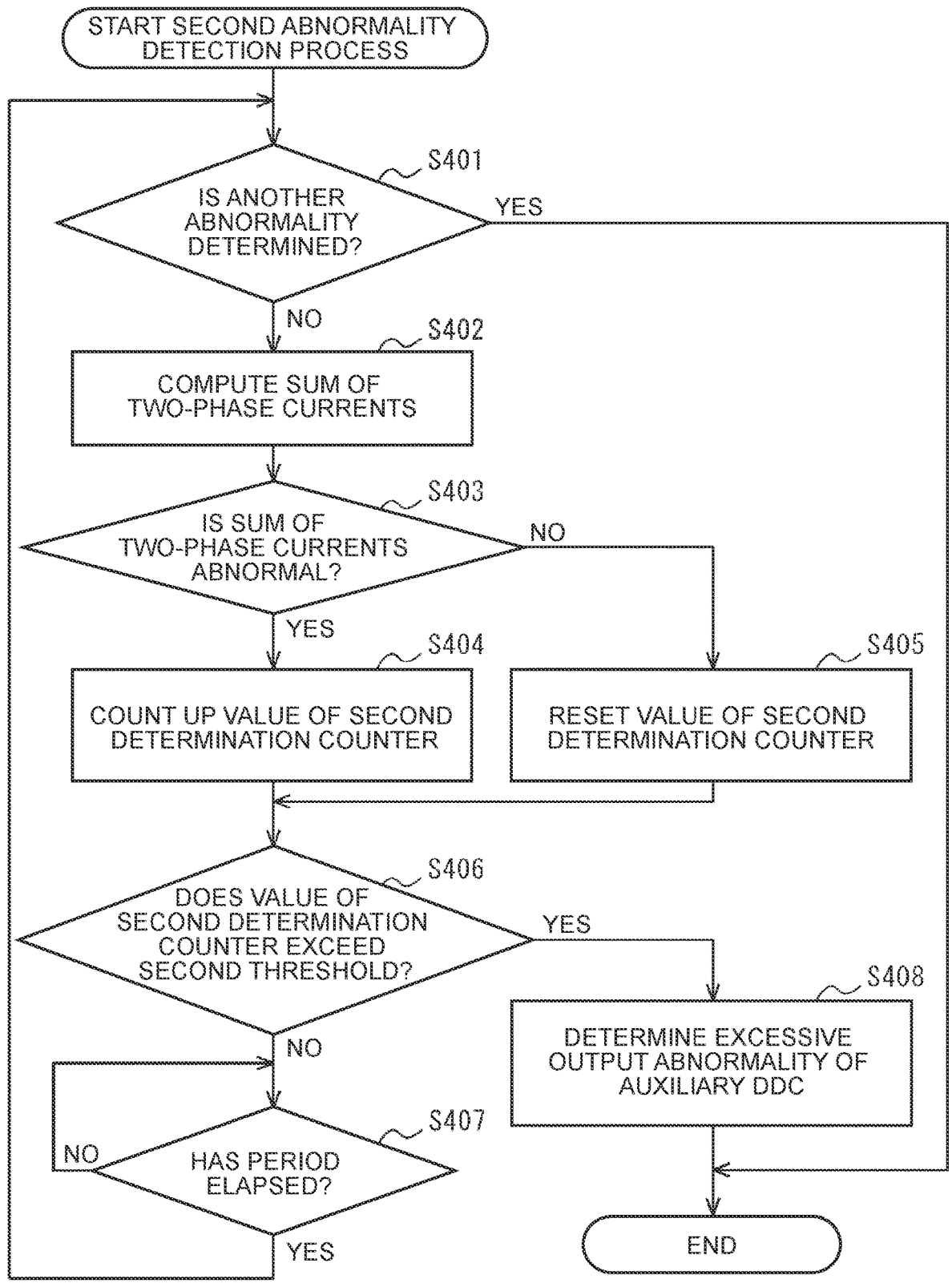
FIG. 4 is a flowchart of a second abnormality detection process that is executed by the solar control system.

FIG. 4 is a flowchart that illustrates the procedure of the second abnormality detection process that is executed by the processing unit 100 of the solar control system 1. The second abnormality detection process illustrated in FIG. 4 is started when, for example, the ignition of the vehicle is turned on as in the case of the first abnormality detection process and is repeatedly executed at intervals of a predetermined period (for example, 8 ms) until the source of the abnormality is determined and the process ends. At the start of the process, the count value of a second determination counter (described later) is reset.

Step S401

The processing unit 100 determines whether another abnormality is determined in the solar control system 1. Another abnormality is an abnormality other than excessive output from the first DDC 41 or the second DDC 42 subjected to detection in the second abnormality detection process and may include, for example, an abnormality of the solar DDC 21, an abnormality of the high-voltage DDC 30, and the like. If the second abnormality detection process is executed when another abnormality has been already determined, it is presumable that an accurate result or a high-reliability result is not obtained. Thus, when another abnormality is determined (YES in step S401), the second abnormality detection process ends. On the other hand, when another abnormality is not determined (NO in step S401), the process proceeds to step S402.

Step S402

The processing unit 100 computes the sum of two-phase currents. The sum of two-phase currents is the sum of a current output from the first DDC 41 of the auxiliary DDC 40 and a current output from the second DDC 42 of the auxiliary DDC 40 in a state where a command value for setting an output current to zero is issued from the DDC control unit (not shown) to each of the drive circuits D1, D2. The processing unit 100 acquires the value of current detected by the first output current sensor 44 and the value of current detected by the second output current sensor 45 from the auxiliary DDC 40 and computes a sum current value by adding up those values. When the sum of the two-phase currents is computed, the process proceeds to step S403.

Step S403

The processing unit 100 determines whether the sum of the two-phase currents is abnormal. The determination is performed based on whether the sum of the current values of the first DDC 41 and second DDC 42 of the auxiliary DDC 40 exceeds a predetermined second reference value in a state where the output current command value is zero. An abnormality detection condition is expressed by the expression [|(Output current value of the first DDC 41)+(Output current value of the second DDC 42)|>(Second reference value) and (Output current command value)=0]. The second reference value is set to a predetermined value based on the fact that no current flows when a command value for setting an output current to zero is issued to the first DDC 41 and the second DDC 42 that are operating normally. When the sum of the two-phase currents is abnormal (YES in step S403), the process proceeds to step S404. On the other hand, when the sum of the two-phase currents is normal (NO in step S403), the process proceeds to step S405.

Step S404

The processing unit 100 counts up by incrementing the value of the second determination counter by one. The second determination counter is a counter for achieving abnormality determination of the sum of two-phase currents with high reliability and is used to count a time during which the abnormal state of the sum of two-phase currents is continuing. The second determination counter is typically provided in the processing unit 100. When the value of the second determination counter is counted up, the process proceeds to step S406.

Step S405

The processing unit 100 resets the value of the second determination counter to zero. This reset means that the abnormal state of the sum of the two-phase currents, which has been continued from its occurrence, is interrupted. When the value of the second determination counter is reset, the process proceeds to step S406.

Step S406

The processing unit 100 determines whether the value of the second determination counter exceeds the second threshold. The determination is performed in order to determine an abnormality in the sum of the two-phase currents with high reliability. Thus, the second threshold is set to a selected value (count value or time), with which high reliability is ensured, based on the specifications, performance, and the like of the first DDC 41 and the second DDC 42. In the present embodiment, in order to exclude high sticking of the sensor and detect an abnormality of excessive output from the first DDC 41 or the second DDC 42 with high accuracy, the timings of the processes are controlled such that an abnormality determination through the first abnormality detection process is ended and then abnormality determination through the second abnormality detection process is performed. Thus, the second threshold that corresponds to a time taken from occurrence of an abnormality to determination of the abnormality is set so as to be greater than the first threshold, that is, so as to be longer in time (first threshold<second threshold). Determination of an abnormality through the first abnormality detection process is performed while the second abnormality detection process is being executed, so affirmative determination in step S401 is able to be made and then abnormality detection through the second abnormality detection process is able to be ended. When the value of the second determination counter exceeds the second threshold (YES in step S406), the process proceeds to step S408. On the other hand, when the value of the second determination counter does not exceed the second threshold (NO in step S406), the process proceeds to step S407.

Step S407

In order to repeatedly execute the process of step S401, step S402, step S403, step S404, step S405, and step S406 at regular intervals of a predetermined period, the processing unit 100 determines whether the predetermined period to execute the process has elapsed. The predetermined period may be set to a selected value based on the performance desired for the vehicle, the durability of parts or elements used in the solar control system 1, and the like. The period may be the same between the first abnormality detection process and the second abnormality detection process. When the period has elapsed (YES in step S407), the process proceeds to step S401.

Step S408

The processing unit 100 determines an abnormality of excessive output from the first DDC 41 or second DDC 42 of the auxiliary DDC 40 based on an abnormality of the sum of the two-phase currents. When an excessive output abnormality of the auxiliary DDC 40 is determined, the second abnormality detection process ends.

In this way, by executing the first abnormality detection process through step S301, step S302, step S303, step S304, step S305, step S306, step S307, and step S308 and the second abnormality detection process through step S401, step S402, step S403, step S404, step S405, step S406, step S407, and step S408, an abnormality that occurs in the auxiliary DDC 40 made up of the parallel DC-DC converters is able to be determined as an abnormality due to high sticking of the sensor or an abnormality of excessive output from the first DDC 41 or the second DDC 42.

(3) Modification of Second Abnormality Detection Process

Figure 5:
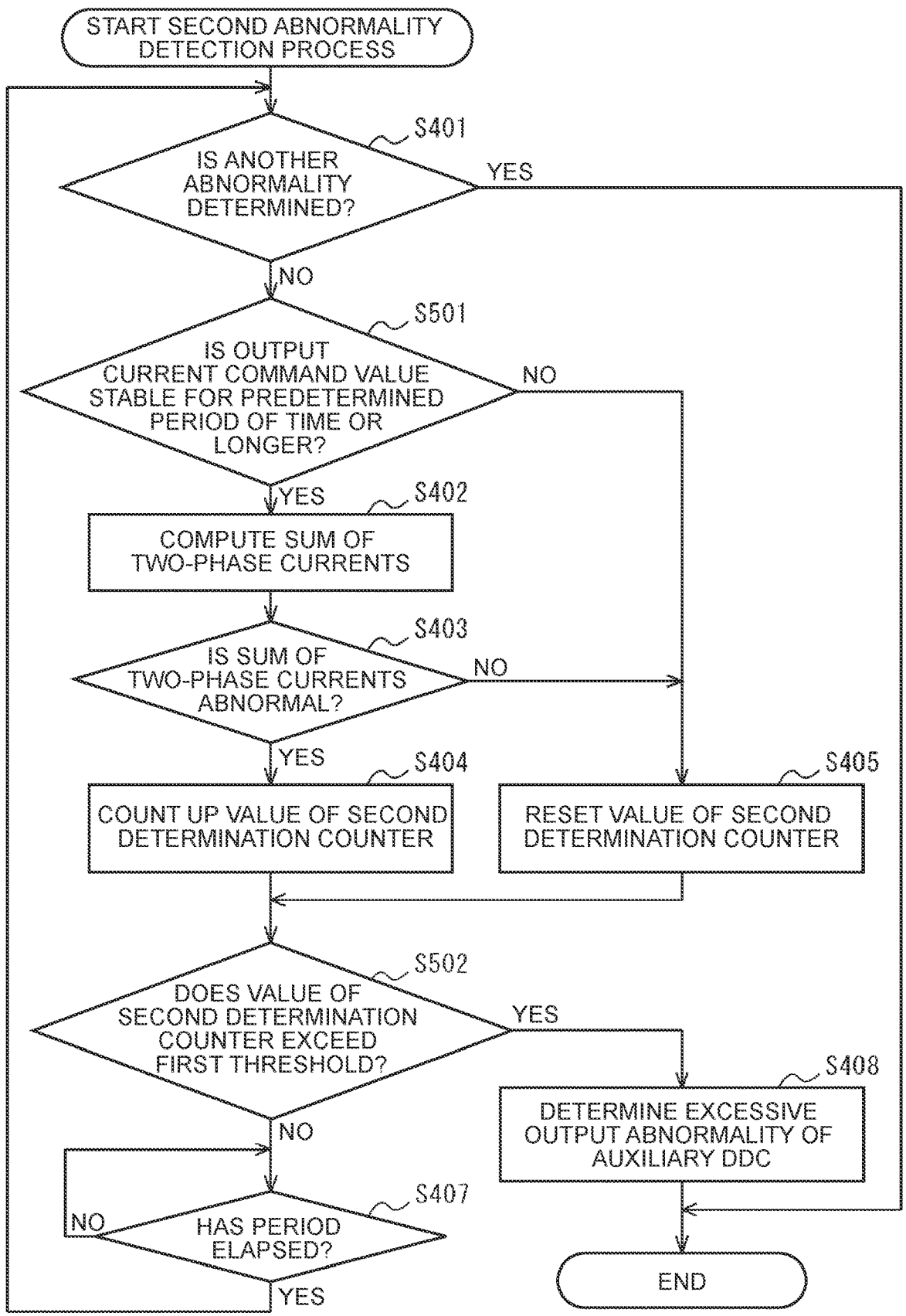
FIG. 5 is a flowchart of a modification of the second abnormality detection process that is executed by the solar control system.

FIG. 5 is a flowchart that illustrates the procedure of a modification of the second abnormality detection process that is executed by the processing unit 100 of the solar control system 1. The modification of the second abnormality detection process shown in FIG. 5 is to control the timings of the processes such that the second threshold longer in time than the first threshold is not used and, after abnormality determination through the first abnormality detection process is ended, abnormality determination through the second abnormality detection process is performed.

The second abnormality detection process according to the modification shown in FIG. 5 differs from the second abnormality detection process shown in FIG. 4 in that step S501 is added between step S401 and step S402 and step S406 is replaced with step S502. Hereinafter, the second abnormality detection process according to the modification will be described specifically on the different steps, and the description of portions that execute the same process is omitted.

Step S401

The processing unit 100 determines whether another abnormality is determined in the solar control system 1. When another abnormality is not determined (NO in step S401), the process proceeds to step S501. On the other hand, when another abnormality is determined (YES in step S401), the second abnormality detection process ends.

Step S501

The processing unit 100 determines whether an output current command value issued to the auxiliary DDC 40 is stable within a predetermined range for a predetermined period of time or longer. In control over the normal DC-DC converter, the output current command value is stable within a predetermined range; however, just after an abnormality occurs, the output current command value significantly varies in order to return the current value to an original value. Thus, when the second determination counter is reset (step S405), that is, the count up of the second abnormality detection process is started after waiting for a predetermined period of time from when a variation in output current command value is detected, that is, from when count up of the first determination counter is started in the first abnormality detection process (step S405), the timings of the processes are able to be controlled such that, after abnormality determination through the first abnormality detection process is ended, abnormality determination through the second abnormality detection process is performed. The predetermined period of time may be set to a selected value according to a time by which the timings of the two processes are shifted. When the output current command value is stable for a predetermined period of time or longer (YES in step S501), the process proceeds to step S402. On the other hand, when the output current command value is not stable for the predetermined period of time or longer (NO in step S501), the process proceeds to step S405.

Step S404

The processing unit 100 counts up by incrementing the value of the second determination counter by one. When the value of the second determination counter is counted up, the process proceeds to step S502.

Step S405

The processing unit 100 resets the value of the second determination counter to zero. When the value of the second determination counter is reset, the process proceeds to step S502.

Step S502

The processing unit 100 determines whether the value of the second determination counter exceeds the first threshold. The determination is performed in order to determine an abnormality in the sum of the two-phase currents with high reliability. The process is caused to proceed after it is checked in step S501 that the output current command value of the auxiliary DDC 40 is stable for the predetermined period of time or longer. Therefore, even when the first threshold is used as a determination reference as in the case of the first abnormality detection process, the timings of the processes are able to be controlled such that, after abnormality determination through the first abnormality detection process is ended, abnormality determination through the second abnormality detection process is performed. When the value of the second determination counter exceeds the first threshold (YES in step S502), the process proceeds to step S408. On the other hand, when the value of the second determination counter does not exceed the first threshold (NO in step S502), the process proceeds to step S407.

Step S407

In order to repeatedly execute the process of step S401, step S501, step S402, step S403, step S404, step S405, and step S502 at regular intervals of a predetermined period, the processing unit 100 determines whether the predetermined period to execute the process has elapsed. When the period has elapsed (YES in S407), the process proceeds to step S401.

In this way, when there occurs an abnormality, the second abnormality detection process is substantially started after it is checked that the stable state of the output current command value has continued for a predetermined period of time. For an abnormality that has occurred in the auxiliary DDC 40 made up of the parallel DC-DC converters, it is possible to determine whether the abnormality is due to high sticking of the sensor or the abnormality due to excessive output from the first DDC 41 or the second DDC 42 while using the same first threshold by executing the first abnormality detection process and the second abnormality detection process.

Operation and Advantageous Effects

As described above, with the solar control system 1 according to the embodiments of the disclosure, the auxiliary DDC 40 is made up of the parallel first DDC 41 and second DDC 42. Thus, when there is an abnormality in the auxiliary DDC 40, even when an input-side current of the auxiliary DDC 40 is not detected, it is possible to determine whether the abnormality is due to the auxiliary DDC 40 itself (excessive output from the DDC) or due to the output current sensor 44 or output current sensor 45 of the auxiliary DDC 40 (high sticking of the sensor) based on the difference in current, which is the differential value between the output current of the first DDC 41 and the output current of the second DDC 42, and the sum of the output current of the first DDC 41 and the output current of the second DDC 42 according to a command value for setting the output current to zero.

In the above embodiments, an example in which the auxiliary DDC 40 is made up of the two parallel first DDC 41 and second DDC 42 has been described. Alternatively, the auxiliary DDC 40 may be made up of three or more DC-DC converters connected in parallel. In the case of the configuration in which the three or more DC-DC converters are connected in parallel, an output current sensor is provided for each phase, and a difference in current between any combination of two phases of the DC-DC converters is subjected to determination. Thus, it is possible to identify a sensor in high sticking.

The embodiments of the technology of the disclosure have been described; however, the disclosure is not limited to a solar control system. The disclosure may also be interpreted as a method that is performed by the solar control system, a program that implements the method, a non-transitory computer-readable storage medium that stores the program, a vehicle that includes the solar control system, or the like.

The solar control system of the disclosure is usable in a vehicle or the like that charges a battery by using electric power generated by a solar panel.

What is claimed is:

1. A solar control system comprising:
    a solar unit configured to output electric power generated by a solar panel;
    a battery configured to be supplied with electric power from the solar unit;
    a first DC-DC converter and a second DC-DC converter inserted in parallel between the solar unit and the battery and each configured to control electric power, supplied from the solar unit to the battery, based on a command value;
    a first sensor configured to detect a first output current output from the first DC-DC converter;
    a second sensor configured to detect a second output current output from the second DC-DC converter; and
    a processing unit configured to, when there is an abnormality in the system, determine whether there is an abnormality in at least one of the first sensor and the second sensor based on a differential value between the first output current and the second output current;

wherein the processing unit is configured to, when there is an abnormality in the system, determine whether there is an abnormality in at least one of the first DC-DC converter and the second DC-DC converter based on a total value of the first output current and the second output current in a state where the command value for setting an output current to zero is issued; and to perform the determination based on the total value of the first output current and the second output current after the determination based on the differential value between the first output current and the second output current.

2. The solar control system according to claim 1, wherein the processing unit is configured to, when an abnormality other than an abnormality of the first DC-DC converter or an abnormality of the second DC-DC converter has been already determined, end the determination based on the total value of the first output current and the second output current.

3. The solar control system according to claim 1, wherein the processing unit is configured to, when the differential value between the first output current and the second output current exceeds a first threshold, determine that at least one of the first sensor and the second sensor is in an abnormal state in which the at least one of the first sensor and the second sensor always detects a maximum value.

4. The solar control system according to claim 1, wherein the processing unit is configured to, when the total value of the first output current and the second output current exceeds a second threshold, determine that at least one of the first DC-DC converter and the second DC-DC converter is in an abnormal state in which the at least one of the first DC-DC converter and the second DC-DC converter outputs an excessive current not in accordance with the command value.

5. A vehicle comprising the solar control system according to claim 1.

6. A method that is executed by a solar control system that includes a solar unit configured to output electric power generated by a solar panel, a battery configured to be supplied with electric power from the solar unit, a first DC-DC converter and a second DC-DC converter inserted in parallel between the solar unit and the battery and each configured to control electric power, supplied from the solar unit to the battery, based on a command value, a first sensor configured to detect a first output current output from the first DC-DC converter, and a second sensor configured to detect a second output current output from the second DC-DC converter, the method comprising:

determining whether there is an abnormality in at least one of the first sensor and the second sensor based on a differential value between the first output current and the second output current, when there is an abnormality in the system;

determining whether there is an abnormality in at least one of the first DC-DC converter and the second DC-DC converter based on a total value of the first output current and the second output current in a state where the command value for setting an output current to zero is issued, when there is an abnormality in the system; and performing the determination based on the total value of the first output current and the second output current after the determination based on the differential value between the first output current and the second output current.

7. A non-transitory storage medium storing functions that are executed by a computer of a solar control system that includes a solar unit configured to output electric power generated by a solar panel, a battery configured to be supplied with electric power from the solar unit, a first DC-DC converter and a second DC-DC converter inserted in parallel between the solar unit and the battery and each configured to control electric power, supplied from the solar unit to the battery, based on a command value, a first sensor configured to detect a first output current output from the first DC-DC converter, and a second sensor configured to detect a second output current output from the second DC-DC converter, the functions comprising:

determining whether there is an abnormality in at least one of the first sensor and the second sensor based on a differential value between the first output current and the second output current, when there is an abnormality in the system;

determining whether there is an abnormality in at least one of the first DC-DC converter and the second DC-DC converter based on a total value of the first output current and the second output current in a state where the command value for setting an output current to zero is issued, when there is an abnormality in the system; and performing the determination based on the total value of the first output current and the second output current after the determination based on the differential value between the first output current and the second output current.

* * * * *